INVENTORS
MAURICE P. SIEGER
BY JAMES A. ADAIR

THEIR ATTORNEY

Sept. 28, 1965 M. P. SIEGER ETAL 3,208,260
ROLLING MILL
Filed Aug. 18, 1960 10 Sheets-Sheet 2

INVENTORS
MAURICE P. SIEGER
BY JAMES A. ADAIR

THEIR ATTORNEY

INVENTORS
MAURICE P. SIEGER
BY JAMES A. ADAIR
THEIR ATTORNEY

Sept. 28, 1965  M. P. SIEGER ETAL  3,208,260
ROLLING MILL

Filed Aug. 18, 1960  10 Sheets-Sheet 4

INVENTORS
MAURICE P. SIEGER
BY JAMES A. ADAIR

THEIR ATTORNEY

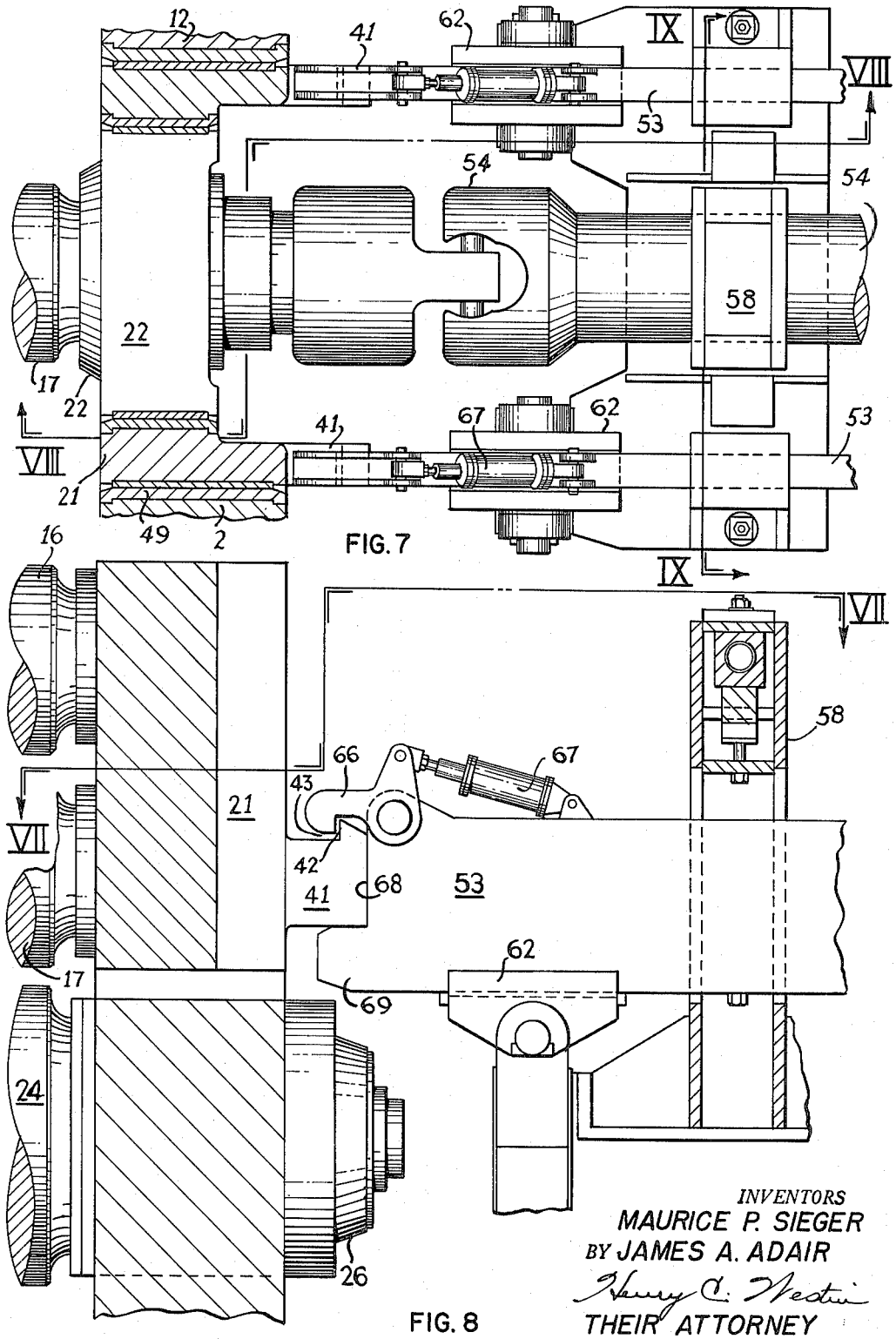

Sept. 28, 1965  M. P. SIEGER ETAL  3,208,260
ROLLING MILL

Filed Aug. 18, 1960  10 Sheets-Sheet 6

INVENTORS
MAURICE P. SIEGER
BY JAMES A. ADAIR

THEIR ATTORNEY

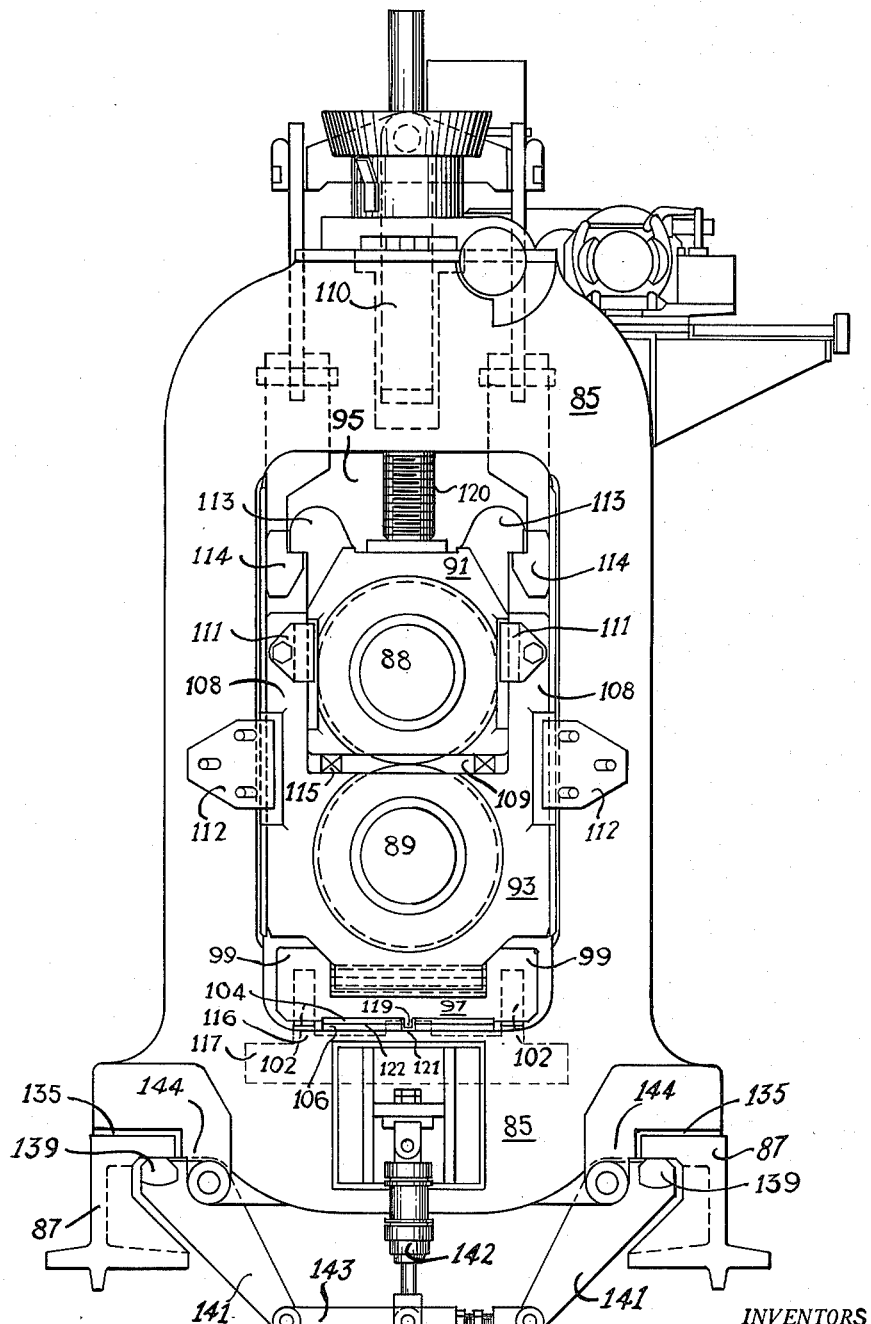
FIG. II

INVENTORS
MAURICE P. SIEGER
BY JAMES A. ADAIR
THEIR ATTORNEY

Sept. 28, 1965    M. P. SIEGER ETAL    3,208,260
ROLLING MILL

Filed Aug. 18, 1960    10 Sheets-Sheet 9

INVENTORS
MAURICE P. SIEGER
BY JAMES A. ADAIR

THEIR ATTORNEY

INVENTORS
MAURICE P. SIEGER
BY JAMES A. ADAIR

THEIR ATTORNEY

United States Patent Office 3,208,260
Patented Sept. 28, 1965

3,208,260
ROLLING MILL
Maurice Paul Sieger, Upper St. Clair Township, Allegheny County, and James R. Adair, Pittsburgh, Pa., assignors to United Engineering and Foundry Company, Pittsburgh, Pa., a corporation of Pennsylvania
Filed Aug. 18, 1960, Ser. No. 50,410
22 Claims. (Cl. 72—239)

This invention relates to a rolling mill for processing metallic material and primarily to certain novel components thereof and to auxiliary apparatus for automatically, rapidly and efficiently removing and replacing the rolls thereof.

In the normal operation of a rolling mill plant, such as a hot strip continuous rolling mill, the number of rolling mill stands that go to make up the mill may number as many as twelve, each generally including a pair of relatively small diameter work rolls which serve to reduce a strip passed therebetween and a pair of back-up rolls provided to lend stiffness to the smaller diameter work rolls. A mill of this type usually concludes with a finishing train consisting of six or seven stands tandemly arranged wherein the strip is given its final reduction.

A necessary incident to the operation of such a mill, particularly with respect to the finishing train thereof, is the frequent removal of the work rolls necessitated by their becoming worn requiring dressing and replacement by new ones. "Roll Changing", as the process of removing worn rolls and replacing them with new ones is generally denominated in the trade, is presently accomplished, in the case of the work rolls, by engaging one end of one of the rolls with a roll-carrying device, sometimes referred to as a porter bar or C hook. This device is supported by a mill crane by which means it is moved laterally thereby to draw the roll, with its chocks and bearings, from the windows of the mill. To insert a new roll into the mill, this operation is repeated in reverse order.

Because of the cumbersomeness of the roll assembly, that is, the roll, bearings and chocks, and the great weight thereof, the movement during roll changing is performed very slowly. Prior to this step, however, the roll must be freed, that is to say, the screws of the mill must be moved back to permit sufficient vertical movement of the rolls, which is a very time-consuming procedure, taking as much as five minutes, the driving couplings disconnected from the driving spindles, the hydraulic connections disconnected from their supply lines and the keeper plates or latches released that secure the chocks in the mill.

It is to be appreciated that when the back-up rolls are changed by employing a roll-changing rig, the work rolls are usually also removed whereby all the rolls are changed together. If the changing of only the work rolls is involved, then these rolls are removed from and reinserted into the mill individually. In either event, in addition to requiring the services of several workmen to accomplish the roll-changing operation, the assistance of one or more mill cranes is mandatory. Since the crane or cranes will be occupied for this purpose for a considerable length of time, other functions of the plant, requiring the services of the crane must be held in abeyance pending the completion of the roll-changing operation.

Not only is it extremely desirable to provide a roll-changing system that will not require the use of any cranes and one that will reduce the manual assistance necessary, but even of more importance is the need for keeping at a minimum the downtime of the mill incident to roll changing. In the case of a six stand tandem mill, it is not uncommon to experience more than a forty-five minute delay in changing the work rolls thereof. Moreover, this operation usually is performed as frequently as every two to four operating hours so that the aggregate of the lost production time is most costly.

One of the primary objects of the present invention relates to a system for changing the work rolls of one or more stands of a rolling mill that will be independent of any assistance of a mill crane or workmen, and in connection with which the time required for the operation will be reduced to a fraction of that which is now required.

It is another object of this invention to provide an extremely rapid system of changing the work rolls of a rolling mill including novel roll chocks wherein the roll assemblies are adapted to be moved into and out of the mill as a unit, means being provided to cooperate with the roll assemblies to rapidly move and support the roll unit as it moves into and out of the mill.

It is a further object of this invention to provide means for supporting both a worn roll unit and a new roll unit which is adapted to directly receive a roll unit discharged from the mill, remove the roll unit therefrom and automatically position, in the same motion, a replacement roll unit in proper alignment for insertion into the mill.

It is another object of this invention to provide means arranged to pass through the windows of a mill and adapted to engage one of the work-roll chocks, thereby to push out of and pull into the mill the work rolls thereof and to guide the rolls during this movement.

A still further object of this invention is to provide an improved chock arrangement whereby one work-roll chock is adapted to fit into the other, the lower roll being permitted to separate itself a slight distance from the other and in which both work rolls are supported by the top back-up-roll chock, so that the work rolls may be raised to a predetermined position and supported by the back-up-roll chock when they are being changed.

It is another object of this invention to provide means for positioning the back-up-roll chocks and the mill spindles, whereby the work rolls and the spindles will be maintained in proper alignment during the roll changing operation so that the spindle couplings will receive the ends of new rolls as they are passed into the mill.

It is a still further object of this invention to provide a latch adapted to engage one of the work-roll chocks for connecting the chock to the means provided for inserting the work-roll unit into the mill and, when the rolls are in their operating position, to maintain engagement thereby to resist axial movement of the rolls during rolling.

Another object of this invention is to provide a rolling mill including a sled in which the roll unit is carried and supported during both the rolling operation and the roll-changing operation.

It is another object of this invention to provide means for ejecting from and inserting into a mill a roll unit which means is also used to move the mill stand laterally for steel pass line adjustment.

These objects, as well as the other novel features and advantages of this invention, will become more apparent by making reference to the following description and the drawings referred to therein of which:

FIG. 7 is a plan sectional view of the spindle end taken on lines VII—VII of FIG. 8;

FIG. 8 is an elevational view of the elements shown in FIG. 7 taken on lines VIII—VIII of FIG. 7;

FIG. 11 is a front elevational view of a modified form of the roll-changing device applied to a 2-High mill;

Figure 1:
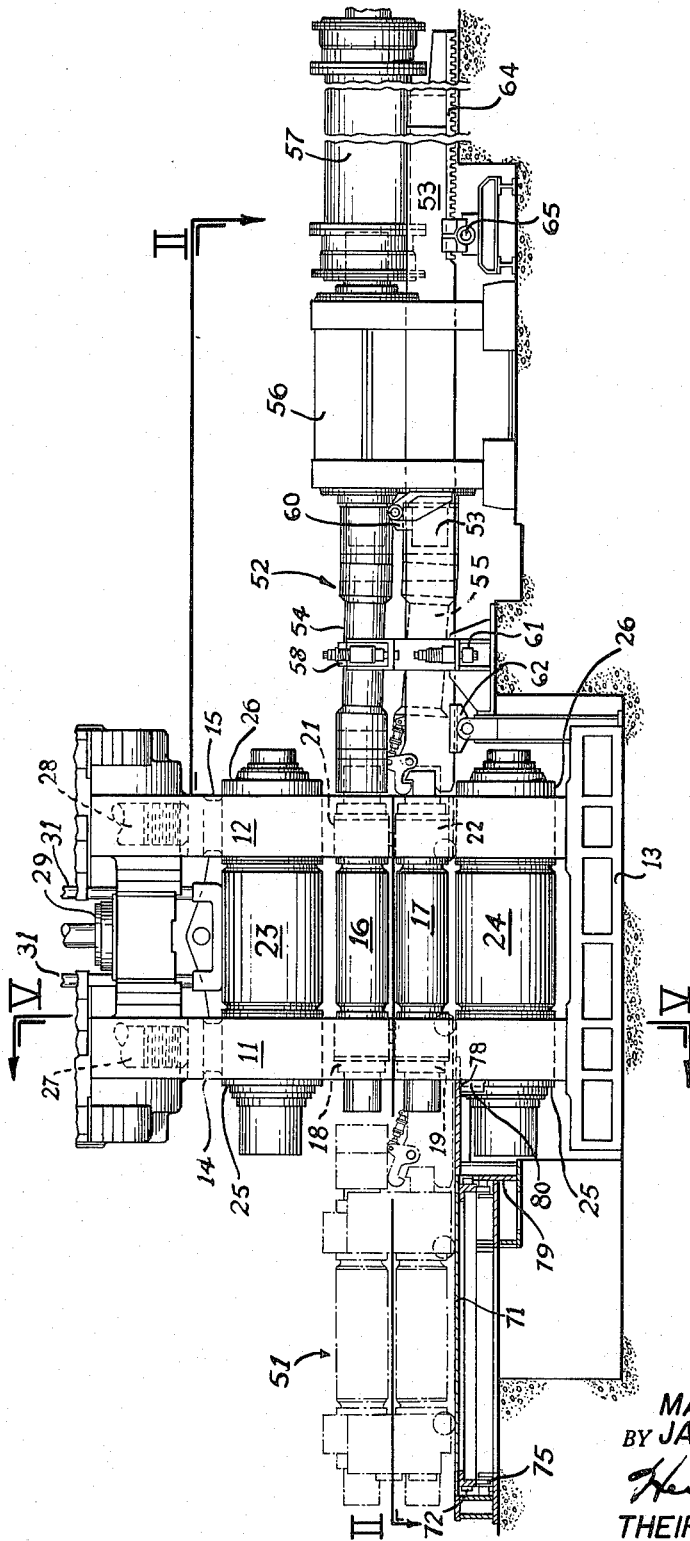
FIG. 1 is an elevational view of a 4-High rolling mill embodying the preferred form of the present invention with the one side thereof shown in section taken on line I—I of FIG. 2 and illustrating in phantom a roll unit as discharged from the mill.

With reference to FIGS. 1, 2, 3, 4 and 5, there is illustrated a 4-High rolling mill comprising a pair of vertical spaced-apart housings 11 and 12 interconnected at their bottoms by horizontally extending bedplates 13 and at the top by the usual rigid separator, not shown. The housings are formed with vertically extending windows 14 and 15, best shown in FIGS. 4 and 5, into which are received a pair of cooperating work rolls 16 and 17, including front bearing-chock assemblies 18 and 19 and rear bearing-chock assemblies 21 and 22, and back-up rolls 23 and 24 having front and rear bearing chocks 25 and 26 respectively. A single roll, its chocks and bearings are sometimes referred to herein as a "roll assembly" in contradistinction to a pair of work-roll assemblies which is sometimes referred to herein as a "roll unit" or "unit." Centrically arranged in the housings 11 and 12 are the usual mill screws 27 and 28 for adjusting the back-up-roll assembly and resisting the rolling pressure imposed thereon. The top back-up-roll assembly is provided with a balance system consisting of a centrically arranged piston-cylinder assembly 29 and downwardly extending arms 31 for engaging upper projections (see FIGS. 4 and 5) on the top back-up-roll chocks 25 and 26, and by which the chocks are held against the mill screws 27 and 28 and raised when the roll-changing operation is to be performed, which operation will be more fully explained hereinafter.

Figure 4:
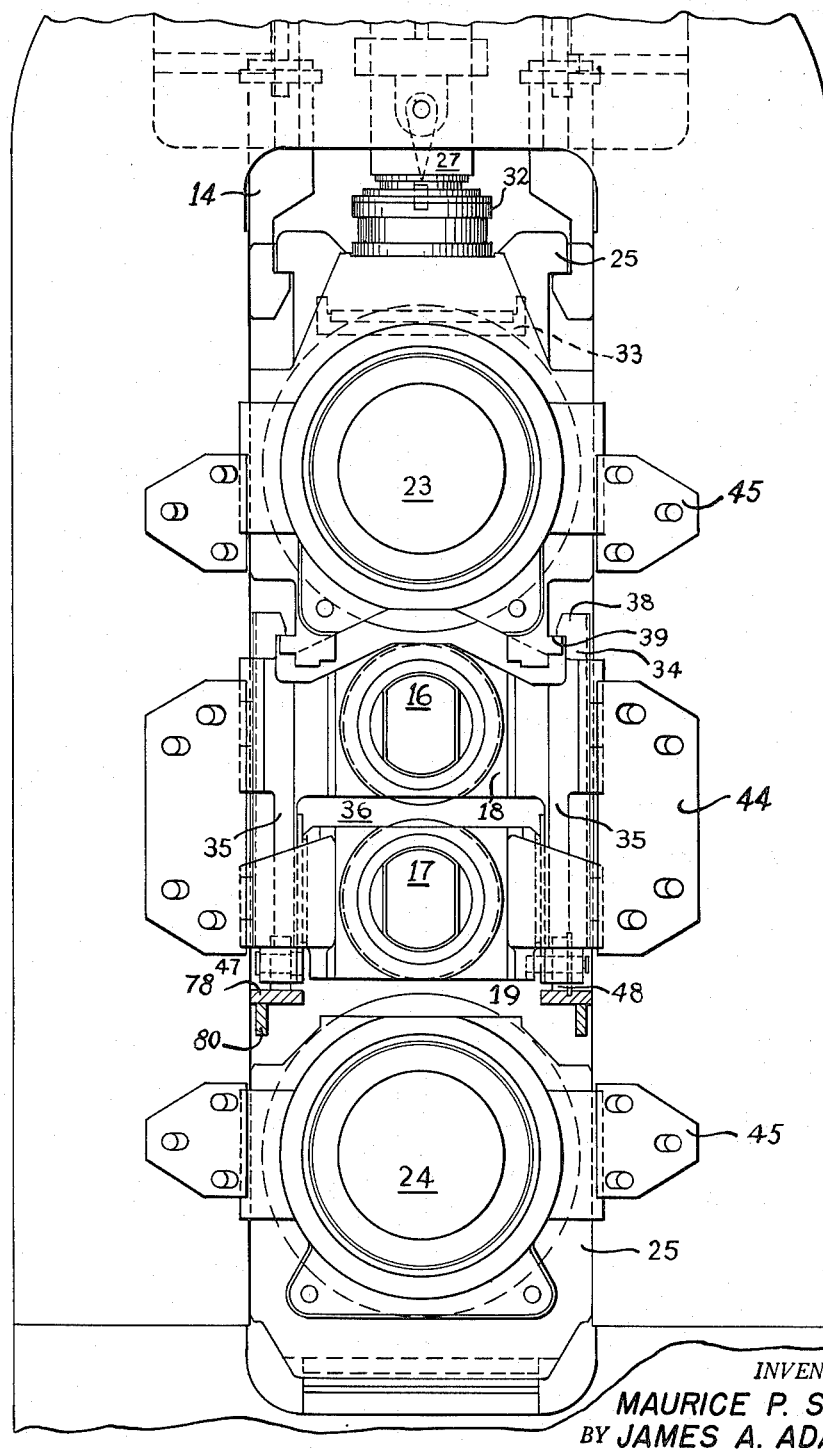
FIG. 4 is an end view of the mill shown in FIGS. 1, 2 and 3.
Figure 5:
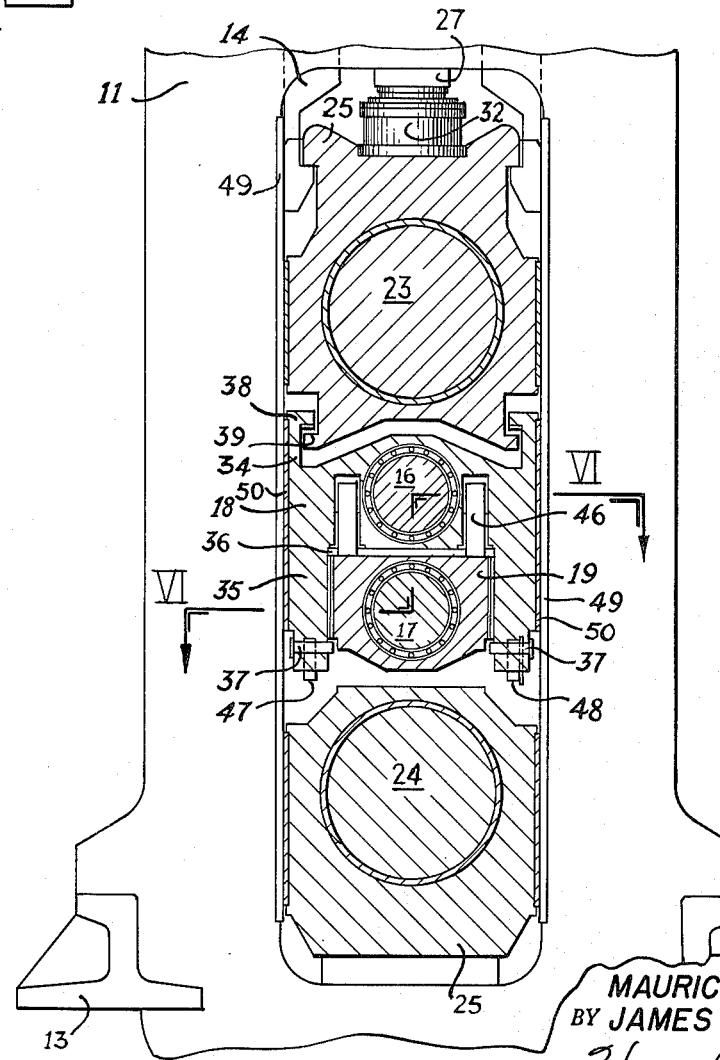
FIG. 5 is a sectional end view illustrating the novel chock arrangement taken on lines V—V of FIG. 1.
Figure 9:
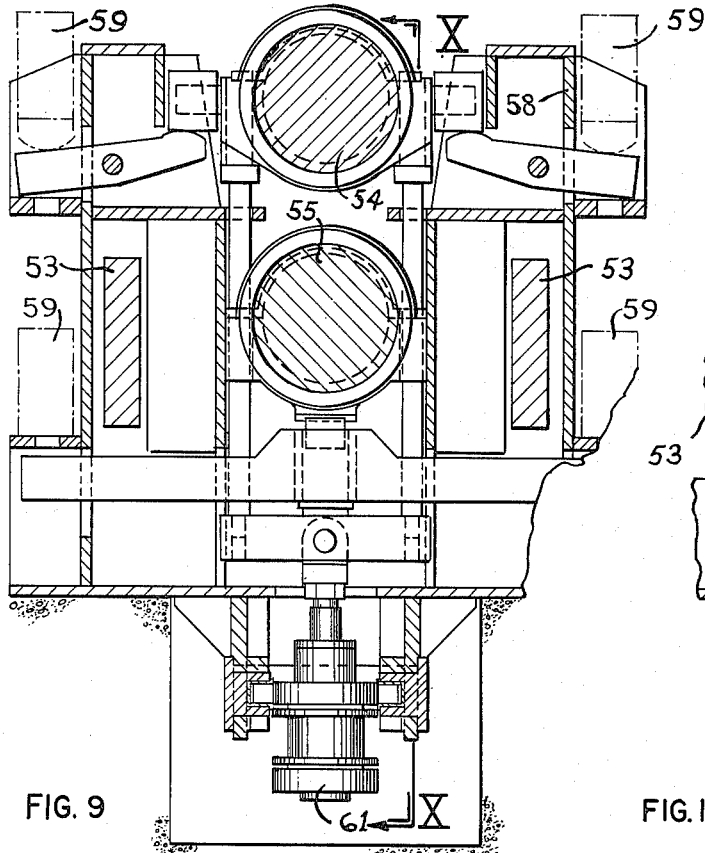
FIG. 9 is a sectional elevational view of the spindle carrier taken on lines IX—IX of FIG. 2.
Figure 10:
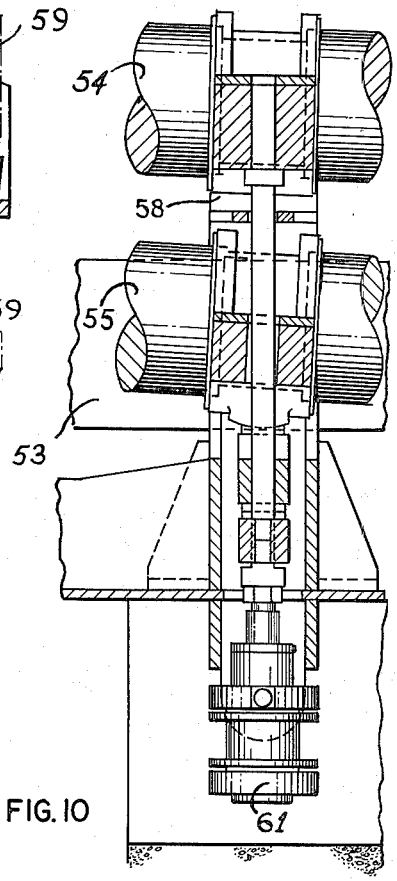
FIG. 10 is a sectional end view of the spindle carrier taken on lines X—X of FIG. 9.

In the preferred form of the present invention, bearing blocks 32 are provided, as best shown in FIGS. 4 and 5, the top surfaces of the top back-up-roll chocks 25 and 26 being recessed to receive the lower ends of the blocks at a location in direct alignment with the mill screws. The blocks are designed to be moved horizontally to permit the work roll and top back-up-roll chocks to be raised a distance defined by the height of the bearing blocks 32 on actuation of the piston-cylinder assembly 29. It will be appreciated that the horizontal movement of the blocks 32 can be effected as soon as the blocks are rendered free, this being permitted by rotating the slow speed rotating screws 27 and 28 a very few turns. A portable shelf 33 is arranged to extend between the windows 14 and 15 and is secured to the housing in a suitable manner, not shown, on which the bearing blocks are caused to slide preliminary to the changing of the rolls.

Figure 6:
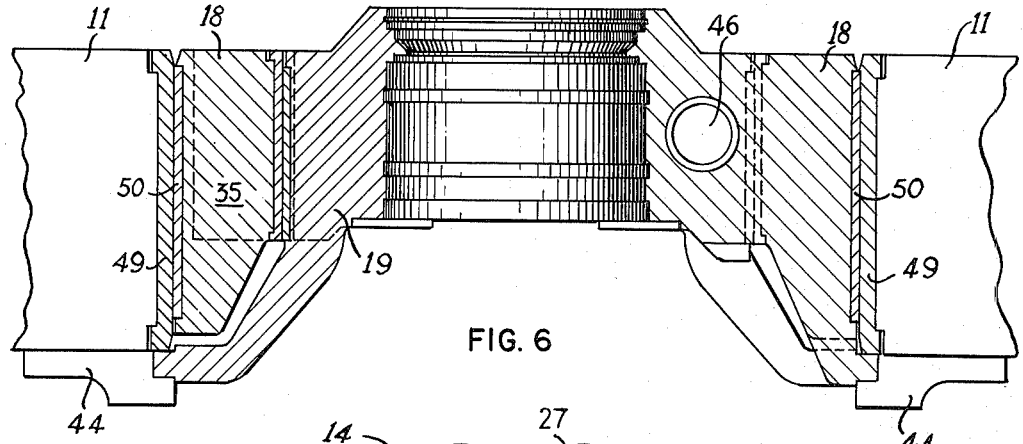
FIG. 6 is a sectional plan view through the work roll chocks taken on lines VI—VI of FIG. 5.

One of the novel improvements represented by the present invention is an improved cooperative chock arrangement. With reference to FIGS. 4, 5 and 6, there are illustrated therein the front, top and bottom work-roll chocks 18 and 19, the top chock 18 having upward and downward extending legs 34 and 35 respectively. The rear work-roll chocks 21 and 22 are similarly constructed. The legs 35 form a recess 36 into which there is received the bottom work-roll chock 19. Vertically disposed liners are provided between the adjacent vertical surfaces of the chocks in the usual manner to take up the clearance between these elements.

In the extreme lower end of the legs 35, latches 37 are provided (see FIG. 5), adapted in one position to project into the recess 36. It will be observed that the depth of the recess and the position of the latches are so related that the lower work-roll chock is permitted to fall away from the top work-roll chock when the lower work roll is lifted out of contact with the lower back-up roll.

The upper legs 34 of the top work-roll chock are provided with projections 38 which are engaged by cooperating projections 39 provided in the lower end of the top back-up-roll chocks 25. The rear back-up-roll chock 26 is constructed in a similar fashion. The projections 38 and 39 extend the full widths of the chocks, being provided with cooperating flat sliding surfaces, the reason for which will be explained hereinafter. The rear work-roll chock 22 is provided with stepped ends 41, best shown in FIGS 7 and 8, adapted to extend through the windows 15 when the chock is in the operative position, each having a vertical straight surface 42 and a recess 43, the function of which will be explained hereinafter.

It is a feature of the construction of the work-roll chocks that independent vertical deflection thereof be permitted thereby to avoid any tendency of the chocks to bind as they are deflected by the imposition of the rolling loads thereon. To accomplish this object, the chocks are so arranged that they may move relative to each other in a vertical direction as the rolls are deflected by loads imposed thereon. As best shown in FIG. 4, axial movement of the chocks is prevented by common keeper plates 44 secured to the front face of the housing 11 which project into the windows 14 where they engage the front face of the chocks 18 and 19. Also illustrated in FIG. 4 are keeper plates 45 provided for the back-up-roll chocks 25, there being similar keeper plates also at the rear of the mill for the rear chocks of the back-up rolls. Piston cylinder assemblies 46, as shown in FIG. 5, are received in the chocks 18 and 21, arranged so that the piston thereof will engage the lower work-roll chocks 19 and 22 to force the roll 17 thereof away from the roll 16.

To the legs 35 of each of the upper work-roll chocks 18 and 21, there are rotatably secured wheels 47 and 48 respectively, the wheels 47 located on the one side of the chocks having flat rolling surfaces and the wheels 48 located on the opposite side thereof being flanged, the purpose and function of which will be more apparent from a reading of the remainder of this specification.

In order to permit easy vertical and axial movement of the work-roll unit, the windows 14 and 15 of the housing 11 and 12 are equipped with bearing liners 49 which extend approximately the full height of the windows, as best shown in FIGS. 5 and 6. Secured to the vertical outer flat surfaces of the top work-roll chocks there are bearing liners 50. This construction, along with the sliding surfaces of the projections 38 and 39 of the top work-roll and back-up-roll chocks, permits quick axial movement of the work-roll assemblies.

For the purpose of discussing the novel work-roll-changing system herein disclosed, reference is made again to FIGS. 1 to 8, wherein there is illustrated, at the operator's side of the mill, a roll unit turntable assembly 51 (See FIGS. 1, 2 and 3) and at the drive side a roll unit inserting and rejecting apparatus 52. With reference first to the apparatus 52 (see FIGS. 1, 2, 7 and 8), extended rigid bars 53 are arranged on either side of the work-roll spindles 54 and 55, which spindles serve to transmit the driving torque to the work rolls from a pinion stand 56 connected by a drive shaft 57 to a motor, not shown. The spindles are supported approximately midway between their ends by a spindle carrier 58 best shown in FIGS. 7 to 10. The carrier, in addition to having a series of springs 59 that balance the spindle during operation of the mill, is provided with a piston-cylinder assembly 61 adapted to raise and support the spindles in an elevated position. The roll unit rejecting and inserting bars, herein sometimes referred to as rejecting apparatus or bars, extends a sufficient lateral distance so that their front ends may be passed completely through the front mill window 14. The extreme forward position of the bars is indicated in phantom in FIG. 1, and in this particular arrangement the bars are made somewhat longer than the actual movement requires in order that the bars may be adequately guided and supported.

Each bar has individual supporting means consisting of a U-shaped support 62 (see FIGS. 1, 7 and 8) adapted to engage the lower surface thereof for restraining the bar against side-wise movement. Other U-shaped members 60 are secured to and extend from the front of the pinion stand 56 and are adapted to engage the top of the bars thereby to resist any tendency of the bars during movement thereof to lift upwardly. The bars are adapted to pass unrestricted through the pinion stand 56, the spindle carrier 58 and the windows 14 and 15 in unison on lateral movement thereof actuated by a drive 63 through racks 64 and pinions 65 located at the motor side of the pinion stand 56.

To the front end of each of the roll rejection bars 53 and on the top thereof, there is pivotally secured a bellcrank shaped hook 66 (see FIGS. 7 and 8) adapted to be raised and lowered by a piston-cylinder assembly 67, which is also secured to the top surface of the bar 53 and through which agency the hook can be brought into and out of locking engagement with the vertical surface of the recess 43, provided in the stepped ends 41 of the top rear work-roll chock 21. In order to push and support the roll unit, the front end of the bars are stepped and have vertical surfaces 68 formed thereon from which projections 69 extend which are adapted to engage with the stepped portions 41 of the chock 21.

Figures 2, 3:
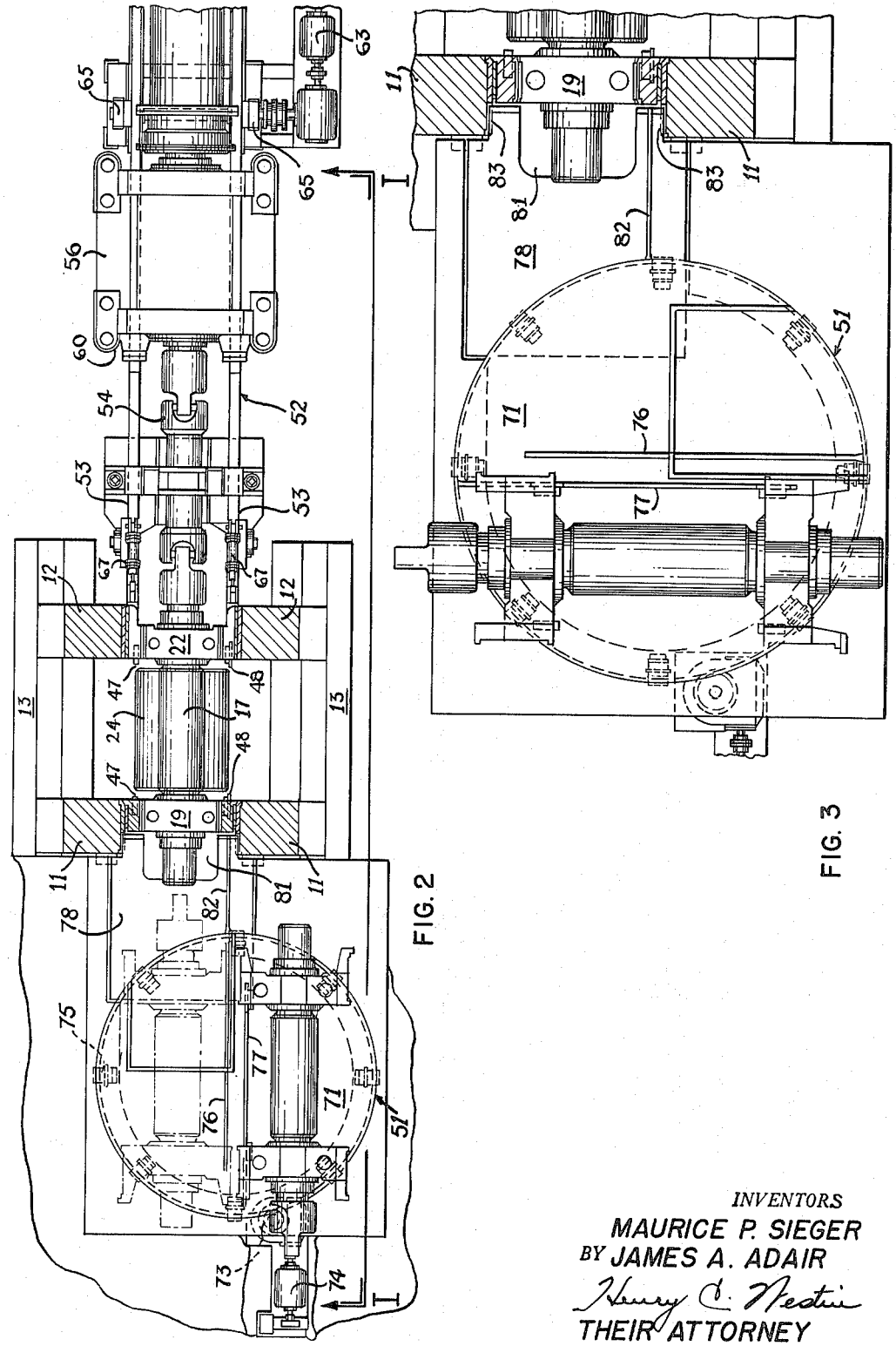
FIG. 2 is a sectional plan view of FIG. 1, taken on lines II—II thereof showing a work-roll unit within the mill, which roll unit is also shown in phantom at one side of the mill alongside of a second roll unit arranged to one side of the mill.
FIG. 3 is a partial plan view of the mill shown in FIGS. 1 and 2 showing the roll supporting turntable in a second operative position, wherein the second roll unit has been rotated 90° about a vertical axis.

With reference now to the roll unit turntable assembly 51 (see FIGS. 1, 2 and 3) located in front of the mill, this assembly consists of a circular roll unit supporting plate 71 having a diameter sufficient to support two, parallel arranged, roll units which, as previously defined, constitute two pairs of roll assemblies arranged in their operative relation. The relationship of the turntable roll unit relative to the mill is best illustrated in FIG. 2, wherein it will be observed that the table is spaced from the mill a sufficient distance to permit rotation of the roll units without interference therewith, and also to allow ample space between the mill and a roll unit when the unit is arranged parallel to the steel pass line of the mill, during which time the mill operators can have access to the mill. A gear 72 (see FIG. 1) being of substantially the same diameter as the plate 71, is secured to the under surface of the plate and meshes with a pinion 73, the pinion being rotated by a worm-wheel motor assembly 74 for rotating the plate 71. The lower end of the gear 72 is provided with a flat surface for engaging a series of equally spaced rollers 75 (see FIGS. 1 and 2) by which it is supported.

As best shown in FIGS. 2 and 3, the upper surface of the plate 71 of the turntable is provided with two parallel slots 76 and 77 arranged on either side of a plane passing through the center of the table and extending from a point on the circumference a substantial distance. It is important to observe that the center of the turntable is located to one side of the centerline of the mills and at such a distance therefrom that on rotation of the turntable through an angle of 180°, a roll unit positioned to the side of the mill will be rotated to a position immediately in front of the window 14, in readiness for insertion in the mill. In this position one or the other of the slots will be in direct alignment with the flanged wheels 48 of the chocks 18 and 21 when the chocks are in the mill. It will further be observed that the turntable is made so that, if desired for any reason to do so, it can be lifted out of its operative position without the need of removing any fastening means.

Between the turntable 51 and the mill, there is provided a removable floor plate 78 having a curved outer end that corresponds with the curvature of the plate 71 whereby a continuous supporting surface is provided for the roll unit as it passes into and out of the mill. The plate is supported by the foundation through a steel structural column 79 (see FIG. 1) at its turntable end and by projections 80 of the mill housing 11 at its housing end. The plate extends into the housing windows 14, a recessed center portion 81 (see FIGS. 2 and 3) being provided to avoid interference with the lower back-up-roll chock 25. Additional support for the plate 78 at the mill end is provided by the housing liners 49 into which the ends of the plate extend through slots 83. This construction is best shown in FIG. 3. In the floor plate 78 there is a single slot 82 which serves as a continuation of the slots 76 and 77 and thus forms a continuous guiding slot or track for the flanged wheels 48 of the chocks 18 and 21.

In order to permit rapid changing of the bottom back-up-roll assembly 24, the upper right hand segment 84 of the turn-table, as one views FIG. 2, is made removable. When the segment 84 is removed, a sufficient opening is provided in front of the mill to permit a C hook to be lowered and moved laterally a sufficient distance to remove from and replace the back-up roll in the mill.

The operation of the aforesaid work-roll-changing system will now be briefly explained in connection with a multiple stand tandem mill, it being understood that a turntable assembly 51 and a rejecting apparatus 52 are provided for each mill stand. Preliminary to the actual changing of the roll unit and while the mill is still being operated, new roll units are placed on the turntable assemblies 51 by a crane. The lower work-roll chocks 19 and 22, prior to being brought to the turntable, are inserted into the top work-roll chocks 18 and 21 and locked in position by moving the latches 37 into the recesses 36 thereof to their locking positions where the latches are engaged by the lower surfaces of the chocks 19 and 22 thus preventing these chocks from falling out of the chocks 18 and 21. When the roll unit is placed on the turntable, the lower chocks 19 and 22 will have, by virtue of their own weight, fallen away from the top chocks 18 and 21, hence the rolls will separate and be easily rotatable so that the spade ends thereof may be positioned with respect to the particular position of the coupling of the spindles 54 and 55. In this manner the spades may be automatically positioned to fit into the couplings of the spindles when the rolls are inserted into the mill.

It is important to note that when the new roll unit is placed on the turntable 51, it assumes the position shown in FIG. 3 or the table is thereafter rotated so that the roll unit will assume a position wtih the axes of rotation extending in a parallel direction with respect to the mill steel pass line so that the mill operators will have sufficient space to walk in front of the mill to attend to their duties. When all the new roll units for each stand have been placed on the turntables, with the flanged wheels 48 riding in the slots 77 and the end of the last strip has passed through the first stand, the table for that particular stand may be rotated so that the roll unit thereon will assume the position shown in FIG. 2, having the spade ends of the rolls on the left hand side. It is to be appreciated that the manipulation of each turntable, as well as the entire roll changing operation, may be accomplished completely by remote control so that the rolls of each stand can be changed simultaneously.

In order to reduce the mill downtime to a minimum, at the instant the strip leaves any particular stand of the mill the turntable can be rotated, the mill decelerated, the hydraulic connections disengaged, the latches retracted to permit axial movement of the roll unit, the mill screws 27 and 28 rotated to disengage the screws from the bearing blocks 32 and immediately thereafter the blocks can be slid out from under the screws and onto the shelf 33 to provide sufficient clearance for the upper back-up-roll chocks 25 and 26 to be raised on operation of the piston-cylinder assembly 29. As mentioned previously, the cylinder 29 is adapted to raise the top back-up and work-roll chocks to a predetermined height whereby the wheels 47 and 48 will be positioned at approximately the same elevation as the removable floor plate 78. At the same time the cylinder 29 is operated, the piston-cylinder assembly 61 of the spindle carrier 58 is actuated to raise and maintain the spindles 54 and 55 in the roll changing position. After this is done, the drive 63 is operated to move the rigid bars 53, by means of the racks 64 and pinions 65, from a position out of engagement with the top work-roll chock 21 into a position wherein the surfaces 68 and the projection 69 of the bars will engage the surfaces 42 of the stepped ends 41 and support the end of the roll unit. Once this is done, on operation of the piston-cylinder assemblies 67, the hooks 66 are rotated into the recesses 43 to engage the projection 41 of the chock 21. The drive 63 is again operated to eject the roll unit from the mill during which operation the spades of the rolls will automatically disengage themselves from the spindles 54 and 55.

During the first period of the movement of the roll unit, the unit will be supported by the top back-up-roll chocks by virtue of the engagement of the projecting surfaces 38 and 39 of the top work-roll chocks and of the back-up-roll chocks respectively. As the unit continues to move, the wheels 47 and 48 of the front work-roll chock 18 will engage the floor plate 78, with the flanged wheel running in the slots 82 thereby assisting the bars in guiding the unit as it moves through the mill windows 14 and 15. At approximately the same time, the projections 38 of the top, rear work-roll chock will pass beyond the projections 39 of the rear back-up-roll chock and, when this occurs, the weight at the rear of the roll unit will be then carried by the bars 53.

After the roll unit is completely ejected from the mill, the hooks 66 are raised by operation of the piston-cylinder assembly 67 and the bars are moved slightly backwards to permit rotation of the turntable 51. The turntable may then be rotated 180° on operation of the motor 74 to move the work-roll unit from in front of the window 14 and, in the same motion, automatically position the new roll unit in direct alignment with the window 14 of the mill. The bars are then advanced to a supporting position with respect to the projections 41 of the top rear work-roll chock 21 and the hooks 66 are brought in engagement therewith as previously explained. The bars 53 are then retracted on operation of the drive 63 whereby the roll unit will be supported by the turntable 51 and the floor plate 78 during the first period of its movement. After the rear wheels 47 and 48 pass beyond the floor plate 78, the rear end will then be supported by the bars 53 until the projections 38 of the top work roll engage the projection 39 of the rear top back-up-roll chock. As previously mentioned, the work rolls, then being slightly separated from one another, are freely rotatable so that should the spade ends thereof be out of alignment with respect to the spindles 54 and 55, this condition may be readily corrected. Hence, the spades of the rolls will automatically fit into the spindle couplings and the roll unit will assume its operating position whereupon the mill can then be placed in readiness for rolling simply by retracting the bars 53, lowering the spindles, reconnecting the hydraulic system, reinserting the pressure blocks 32, resetting the mill screws 27 and 28 and securing the latches for retaining the roll unit in place in the mill.

As previously mentioned, each of the preliminary steps as well as the actual operation of the roll changing apparatus or apparatuses may be operated in automatic sequence without the need of any workmen and the work rolls of each stand of a tandem mill can be changed at the same time, whereby the downtime will only be a fraction of the time expended by present day devices. Even though some or all of the steps may be performed manually, the time saved where the present invention is utilized is considerable. In addition to eliminating the services of the workmen, the actual removing and replacing of the rolls by employing the present invention does not depend on the services of a crane or cranes, thus overcoming one of the basic limitations of present-day roll changing systems.

Figure 12:
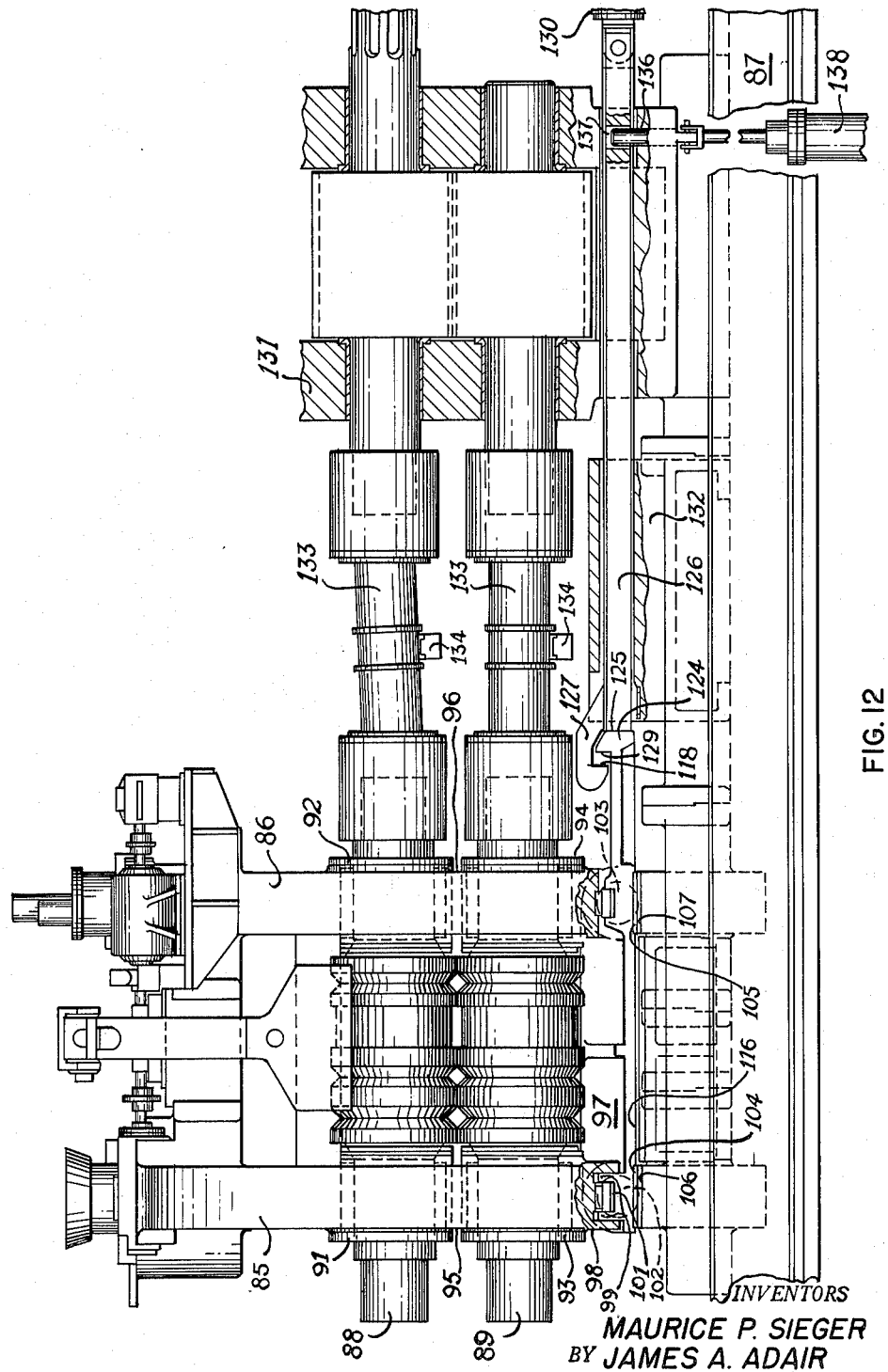
FIG. 12 is an end elevational view of the mill shown in FIG. 11, shown partly in section.
Figure 17:
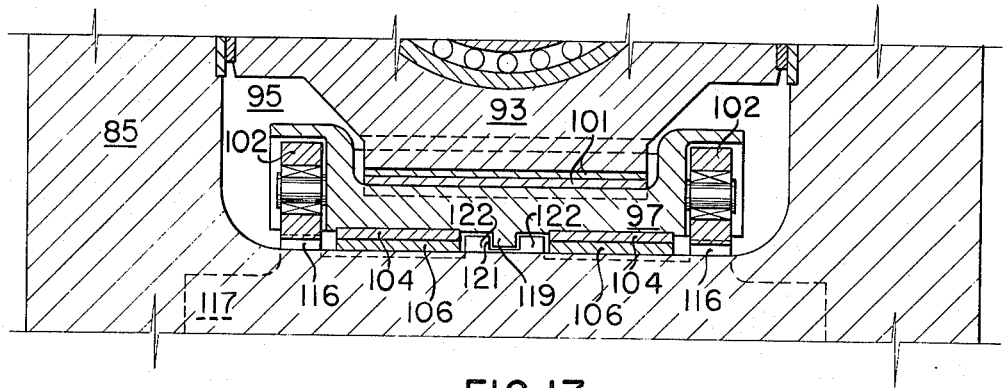
FIG. 17 is a sectional view taken on lines XVII—XVII of FIG. 16.
Figure 16:
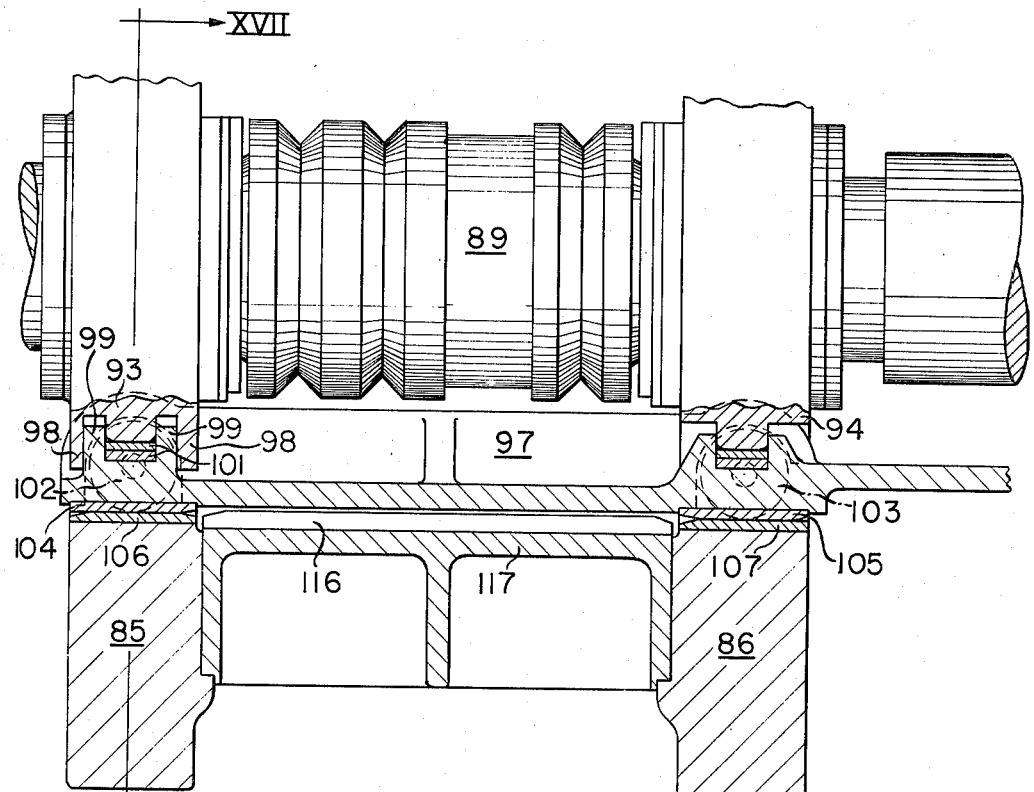
FIG. 16 is an enlarged elevational view partly in section of the lower roll assembly shown in FIG. 12.

With reference now to the modified form of the novel roll changing device herein disclosed as applied to a 2-High rolling mill, which is illustrated in FIGS. 11, 12, 16 and 17, there are provided mill housings 85 and 86 carried by bed plates 87 and having upper and lower rolls 88 and 89 respectively, including upper front and rear bearing-chock assemblies 91 and 92 and lower front and back bearing-check assemblies 93 and 94 located in the windows 95 and 96 of the mill. As best shown in FIGS. 12, 16 and 17, the lower chocks are carried by a sled 97 arranged in the bottom of the housings and adapted to extend into and between the windows 95 and 96. The front lower chock 93 has downwardly extending projections 98 at its bottom which engage two upwardly extending projections 99 provided in the front of the sled. Filler plates 101 are provided to compensate for roll wear in the usual manner which are inserted between the sled and the chocks. The sled has a pair of wheels 102 and 103 secured to its front and back respectively. The sled 97 has at the front and rear thereof bearing-lined sliding surfaces 104 and 105 which engage adjacent horizontal surfaces 106 and 107 formed in the windows 95 and 96, as best shown in FIGS. 16 and 17. Each of the lower chocks have upwardly extending legs 108 forming an opening 109 (see FIG. 11) into which the top chocks 91 fit, the latter being prevented from moving laterally relative to the lower chocks by keeper plates 111 and the lower chock being prevented from moving laterally relative to the housings by keeper plates 112. The upper chocks 91 have projections 113 at their tops which are engaged by cooperating projections 114 of the roll balance system, the cylinder 110 thereof and the mill screws 120 being similar in construction and function to those shown in the 4-High mill arrangement. When the balance system is operated to raise the top chocks away from the bottom ones, stools 115 are adapted to be inserted between the chocks for a porpose to be explained ohu tween the chocks for a purpose to be explained later. Also as in the 4-High mill roll arrangement, the pair of rolls, chocks and bearing assemblies of the 2-High mill constitute a roll unit and is moved into and out of the mill as a unit.

Spaced parallel tracks 116 are interposed between the surfaces 104 and 105 and from the inboard end of the chock 94 to the inboard end of the housing 85 which are engaged by the wheels 102 and 103 after the sled has been moved over the surfaces 106 and 107 of the housing. The tracks 116 as best shown in FIGS. 11 and 17 consist of built-up portions of the lower separator 117. The tracks 116 are in horizontal alignment with the floor plates and turntable not shown, which elements are of construction and function similar to that of the elements earlier discussed in connection with the preferred embodiment and therefore it is considered to be unnecessary to repeat the description. To assure proper guidance of the roll unit, as best illustrated in FIGS. 11 and 17, the lower surface of the sled 97 is provided with a central downward projection 119 which protrudes into a corresponding slot 121 centrally located at the top of a separator 117. As again shown in FIGS. 11 and 17, the slot 121 is formed by two projections 122 arranged at the top of the separator in which construction the adjacent vertical surfaces thereof will confine the movement of the sled. The slot 121 is continued into the floor plate and turntable not shown, thus providing for guidance during the entire movement of the roll unit.

The drive end of the sled 97 (see FIG. 12) is adapted to extend from the window 96 having a vertically protruding portion 124 which is adapted to be engaged on its one side by a flat surface 125 of a roll unit removing and inserting bar 126. The bar, being centrally arranged with respect to the rolls, is provided with a rigid hook 127 having a surface 128 cooperating with a surface 129 of the protruding portion 124, the hook being made to extend beyond the surface 129 when the surface 125 of the bar is in engagement with the sled. The clearance thus afforded between the surfaces 128 and 129 permits the turntable to be rotated with the bar in its aforesaid engaged position and the bar need not be moved backwards or the hook made removable in order to allow the turntable to rotate the roll unit from in front of the window 95. The bar is moved by means of a piston-cylinder assembly 130. As shown, the bars are designed to pass below a pinion stand 131 and is guided in a frame 132 located between the pinion stand 131 and the mill and below spindles 133 which are supported by a carrier 134.

As shown in FIG. 12, the bedplates 87 extend from the operator's side of the mill beyond the drive side of the pinion stand 131. Bearing liners 135 shown in FIG. 11 extend under the mill and pinion stand a sufficient distance to permit these elements to be moved laterally as an integral unit. The extent of this movement is defined by the length of the rolls so that the mill can be adjusted in order that the various passes of the rolls can be positioned on the steel pass line of the mill.

In order to provide for the use of the piston-cylinder assembly 130 to effect the roll pass adjustment, a locking pin 136 (see FIG. 12) is provided which passes through a hole 137 located in the bar 126 and pinion stand 131, thereby connecting the bar to the pinion stand. The movement of the pin is effected by a piston-cylinder assembly 138 secured to the pinion stand, the piston of which is connected to the pin 136.

A locking arrangement for preventing the housing from moving relative to the steel pass line, as shown in FIG. 11, is provided consisting of a dual toggle system having locking elements 139, comprising a pair of arms 141 for engaging the cooperating surfaces of the bedplates 87 on operation of a piston-cylinder assembly 142 which is connected to toggle links 143. As shown on the aforesaid drawing, the arms 141 are pivotally secured to ears 144 arranged at the lower front of the housing 85 and extend downwardly therefrom. Also as noted in FIG. 11, the cylinder 142 is secured to the front of the housing 85.

In the operation of the roll changing rig as applied to a 2-High rolling mill, as above explained, the piston cylinder 130 is employed to position the various passes of the rolls on the steel pass line of the mill. When the cylinder assembly is operated according to this mode, assuming that the cylinder 142 has been operated to disengage the locking elements 139 from the bedplates 87 to free the mill for lateral movement, the piston-cylinder assembly 138 is operated to insert the pin 136 into the hole 137 of the bar 126 thereby to lock the bar to the pinion stand 131. Hence, on operation of the cylinder 130, movement is imparted to the pinion stand 131 and through its base to the mill, during which movement the mill and pinion stand slide over the bedplates 87.

When it is desired to change the rolls, assuming that the preliminary steps have been taken care of, as previously discussed in connection with the 4-High mill arrangement, prior to the pin 136 being lowered to its non-locking position the mill is pushed to the left as one views FIG. 12 to bring the mill immediately adjacent to the floor plates after which the pin 136 is moved to its non-locking position on operation of the cylinder 138, the keeper plates 112 are retracted and the balance system is actuated to raise the top chocks 91 and 92 and top roll 88 away from the bottom chocks 93 and 94 and bottom roll 89 respectively. Into the space thus provided between the chocks, stools 115 are inserted and the means, not shown, to hold the spindles 133 in the separated roll position is operated. In this manner, even though the diameters of the rolls that are being replaced may differ with respect to the diameters of the new rolls, the axes of the new rolls will be maintained in alignment with the spindles 133 so that, when the new rolls are brought into the mill, their drive ends will automatically pass into the couplings of the spindles.

On insertion of the stools 115, the balance system is again operated to set the top chocks 91 and 92 on the stools, thereby disengaging the projections 114 of the roll balance system from the projections 113 of the top chocks.

The piston-cylinder assembly 130 is then operated whereby the surface 125 of the bar 126 is brought into engagement with the end of the sled 97. During the initial period of the ejection of the roll unit, the surfaces 104 and 105 of the sled will slide over the surfaces 106 and 107 of the housing and the rear wheels 103 will be out of contact with the tracks 116 and the front wheels 102 will be out of contact with the platform. As movement of the roll unit continues, the surfaces 104 and 105 of the sled pass beyond the surfaces 106 and 107 of the housing and the sled will raise slightly so that the rear wheels 103 thereof will contact the tracks 116 and the front wheels 102 will engage with the platform. Once the roll unit is on the turntable, in view of the clearance permitted between the surface 128 of the hook 127 and the surface 129 of the protruding end 124 of the sled 97, the turntable is free to be rotated to remove the used roll unit and replace it with a new roll unit which, of course, will include a sled element.

The replacement set of rolls, as previously mentioned, are separated by stools so that the axes of the new rolls will coincide with the couplings of the spindle 133 when the new roll unit is drawn into the mill. To insert the new roll unit, the piston-cylinder assembly 130 is operated and the surface 128 of the hook 127 will contact the surface 129 of the portion 124 and the sled 97 will be drawn into the mill.

Figure 15:
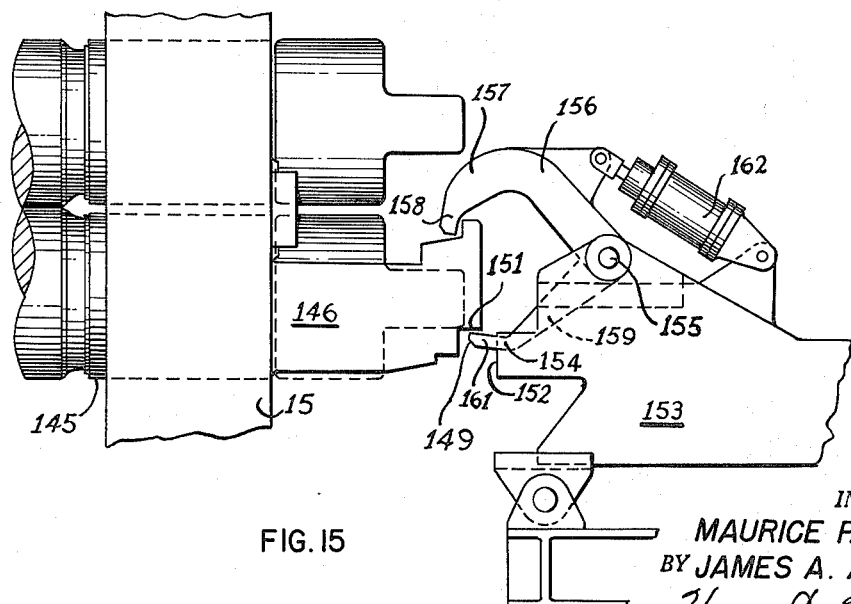
FIG. 15 is a view similar to FIG. 14 showing the latch in a second position.
Figure 13:
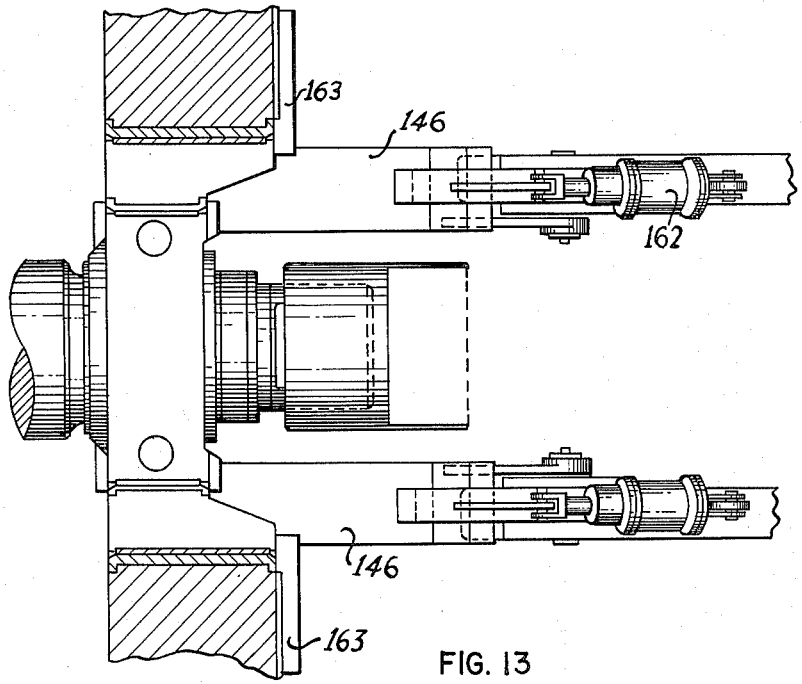
FIG. 13 is a plan view of the modified latch device.
Figure 14:
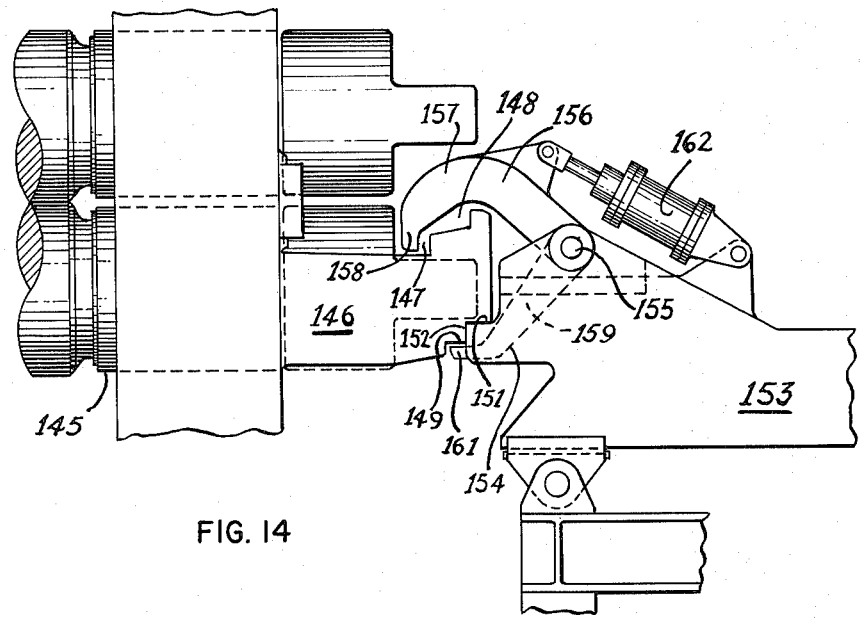
FIG. 14 is an end elevational view of the latch shown in FIG. 13.

With reference to FIGS. 13, 14 and 15, there is shown a modified form of the latching device provided for connecting the reject bars of the roll changing apparatus to the chock. The chock arrangement shown is similar to that disclosed in connection with the 4-High mill, although the modified latch is also adaptable for use in the 2-High mill chock arrangement. As illustrated, the top rear roll chock 145 is provided with parallel portions 146, extending from the window of the mill, which have at their tops stepped recesses 147 and 148 and at the bottom two horizontal flat surfaces 149 and 151 and vertical surfaces 152. The adjacent end of the bars 153 are provided with finger portions 154 adapted to move under the portion 146 of the chock and engage the surfaces 151 and 152 thereby not only to carry the weight of the end of the chock, but also to provide contact for pushing the chock.

Rotatably secured to the ends of each of the bars by a pin 155 is a latch 156 constructed in the form of tongs having an upper curved leg 157 including a vertically extending end portion 158 and a lower leg portion 159 which, in turn, have a horizontally extending end portion 161. The legs 157 and 159 are rigidly secured to the pin so that they will not move relative to each other. In order to move the latches vertically, piston-cylinder assemblies 162 are pivotally secured to the top of the bars 153 and the rods thereof are connected to the upper legs 157.

It is one of the features of this invention that with these latches the usual keeper plates or chock latches are eliminated. This is made possible by providing stops 163 which may be secured either to the housing or to the top rear back-up-roll chock. The stops protrude into the window at the drive side of the mill so that the top work roll chock will abut against the stops when brought into the mill. While the chock is so positioned, as illustrated in FIG. 15, the legs 157 of the latches 156 are raised on operation of the cylinders 162 to allow the portions 158 on movement of the bars to be placed into the recesses 148, wherein they are brought into engagement with the chock. The portions 161 of the legs 159, as a result of the aforesaid movement, will engage the surface 151 of the chock to thereby lock the legs 157 in a gripping position. The bars 153 are prevented from moving laterally by suitable means, such as a brake, for example, connected to the driving motor, not shown. Not only is this a more positive means for preventing the rolls from moving axially than would be the case when keeper plates or latches are employed, but the roll changing is simplified since no time is required for loosening and removing plates or latches.

In the operation of this device in combination with the roll changing apparatus heretofore disclosed, and during operation of the mill, the latches 156, as previously mentioned, will assume the position shown in FIG. 15. Since the chock is not secured to any means other than the latches, on stoppage of the mill and raising of the mill rolls, the bars 153 may be immediately actuated whereby the finger portions 154 will engage the surfaces 151 and support the chock 145. At this time, the legs 157 of the latches 156 will move into the recesses 147, the portions 161 of the legs 159 into a position adjacent to the surfaces 149 and the bars will move into an abutting relation with respect to the surface 152 of the chock, all as illustrated in FIG. 14. When the roll unit is inserted into the mill, the vertical portions 158 of the legs 157 remain in the same recesses 147 whereby they will engage the chock and pull the roll assembly into the mill on movement of the bars 153. Once the chock abuts against the stops 163, the piston-cylinder assemblies 162 can be operated to raise the latches so that the legs 157 will move out of the recesses 147 and into the recesses 148, thus causing the ends 161 of the legs 159 to engage with the surface 151 when the bar is moved a slight bit more. In this position, the legs 157 and the legs 159 lock the chock to the bars 153. It is important to observe that this locking position is maintained even when the chock is moved vertically during rolling, since the legs 157 and 159 will move with the chock without disturbing the relative positions.

In accordance with the provisions of the patent statutes, we have explained the principle and operation of our invention and have illustrated and described what we consider to represent the best embodiment thereof. However, we desire to have it understood that within the scope of the appended claims the invention may be practiced otherwise than as specifically illustrated and described.

We claim:

1. In combination with a rolling mill having a window into which at least a pair of roll assemblies are received,
   a rotatable roll, assembly receiving means positioned adjacent to said window and having two separate, roll assembly supporting areas, one area for supporting a used roll assembly taken from the window of said mill and the other area for supporting a replacement roll assembly,
   said roll assembly receiving means having its axis of rotation offset from the plane containing the axes of rotation of a pair of rolls in said housing in a manner so that on rotation of said receiving means, the area on which a used roll assembly is supported is moved from a position directly in front of and in registry with said window to a position remote therefrom and simultaneously therewith the area on which a replacement roll assembly is supported is moved from a remote position to a position directly in front of and in registry with said window, and
   means for rotating said roll assembly receiving means.

2. In combination with a rolling mill in accordance with claim 1 wherein said roll assembly receiving means comprises a turntable adapted to be rotated about a vertical axis approximately 180°, said supporting areas being constructed so as to permit a used roll unit and a replacement roll unit to be arranged in a side-by-side relationship, said roll assembly receiving means being positioned so that the axes of said rolls when brought into the roll receiving position of said mill will be substantially in a plane coincidental with that in which the axes of the rolls are contained when in their mill operating position.

3. In combination with a rolling mill in accordance with claim 1 wherein said roll assembly receiving means is provided with spaced apart parallel slots adapted to receive a portion of each of the roll assemblies to effect guiding and automatic alignment thereof as they pass to and from the mill, said slots arranged with respect to the operative position of the roll assemblies thereby to maintain the roll assemblies substantially coincidental with their operative axes as they are removed from and inserted into the mill.

4. In combination with a rolling mill according to claim 1 wherein said mill includes a pair of work rolls, each supported by a backup roll, said work rolls including bearings and chocks affixed to the ends thereof, said chocks being so interrelated as to enable said pair of work rolls to be moved as a unit into and out of said window relative to said backup supporting rolls, and wherein said used roll units and replacement roll units consist of a pair of work rolls, said rotatable work roll unit having two separate work roll units supporting areas, one area for supporting a used work roll unit taken from the window of said mill and the other area for supporting a replacement work roll unit.

5. In combination with a rolling mill having a window for receiving a pair of work rolls and a pair of backup supporting rolls, said work rolls including bearings and chocks affixed to the ends thereof, said chocks being so interrelated as to enable said pair of work rolls to be moved as a unit into and out of said window relative to said backup supporting rolls, a work roll unit ejecting and inserting means arranged on one side of said mill and extending generally parallel to the axes of the work rolls and movable through said windows and engageable with at least a chock of one of said work rolls, means for effecting movement of said ejecting and inserting means, a work roll unit supporting means arranged on the side of the mill opposite from said ejecting and supporting means for positioning said work roll unit in line with said window for insertion into the mill and for receiving a work roll unit ejected from said mill.

6. In combination with a rolling mill according to claim 5 wherein said work roll unit ejecting and inserting means includes means for assisting in supporting and guiding the work roll unit during its movement through the mill window.

7. In combination with a rolling mill according to claim 5 having a latch element, said element secured to the work roll unit ejecting and inserting means for securing said means to said one chock of said roll.

8. In combination with a rolling mill in accordance with claim 5 wherein said work roll unit supporting means comprises means for supporting a new work roll unit and a used work roll unit wherein one roll of each unit is arranged above the other roll of said unit in the positions they assume in operation when in the rolling mill, and means for positioning said last mentioned means after it has received a used work roll unit ejected from the mill to remove it from in front of the mill, and in the same motion to move a new work roll unit in front of the mill in position to be engaged by said roll inserting means for insertion into the mill.

9. In combination with a rolling mill according to claim 5, wherein said ejecting and inserting means comprise a bar for engaging and supporting one of said chocks, a latch arranged at the end of said bar engageable with said one chock to connect the chock with said bar when the bar is moved to reject or insert the work rolls, stop means for limiting the lateral movement of said work roll whereupon when said work rolls are drawn into the mill said latch being adapted to be maintained in engagement with said one chock to secure the work roll against said stop during operation of the mill and yet permit the chock to move vertically.

10. In combination with a rolling mill according to claim 9 wherein said one chock has a projecting portion extending through the mill window on the drive side, said portion having two flat surfaces at the bottom and at the top thereof and an opening formed with two stepped recesses, said latch element having an upper leg with a substantially vertically extending end and a lower leg with a substantially horizontally extending end and so arranged that in the roll changing operation said roll ejecting and inserting means abuts against the end of the chock and engages one of the flat surfaces of said projecting portion and the upper leg of said latch element projects into one of said stepped recesses, and when the chock is in the operating position said lower leg engages the other bottom flat surface of said projecting portion and the upper leg protrudes into said second recess and engages the other top flat surface to rigidly lock said chock to said ejecting means and means for moving the legs of said latch toward and away from one another.

11. A rolling mill having windows for receiving a pair of upper and lower work rolls and a pair of upper and lower backup roll assemblies, the rolls of said assemblies having their axes extending in a horizontal direction arranged in substantially the same vertical plane and including bearing and chock members secured to the ends of each roll, said pair of work roll assemblies constituting a work roll unit, each of the chocks of said upper work roll having a pair of upper and lower legs extending therefrom, said lower legs forming recesses into which there are received the chocks of the lower work roll, said recesses being of such a depth that a clearance is provided between the adjacent surfaces of the upper and lower work rolls when the lower work roll is permitted to move away from the upper work roll, a horizontal projection extending from each of said upper legs of said upper work roll chocks, a projection extending from the bottom of each of said upper backup chocks cooperatively engageable with the projections of said upper work roll chocks during removal and replacement of said work roll assemblies whereby the upper backup roll chocks carry the upper and lower work roll assemblies, balance means connected to said upper backup roll assembly to lift the upper backup roll and work roll assemblies away from the lower backup roll assembly.

12. A rolling mill according to claim 11 having latches secured to the lower legs of said upper work roll chocks engageable with said lower work roll chocks to limit the vertical downward movement of said lower work roll.

13. A rolling mill according to claim 11 having means included in the upper work roll chocks for forcing the work roll assemblies away from each other and means for preventing the chocks from moving laterally.

14. A rolling mill according to claim 11 wherein keeper plates are secured to the mill engageable with the work roll chocks on one side of the mill and the chocks of the work rolls are so arranged as to be free to move vertically relative to each other on deflection of said rolls.

15. A rolling mill according to claim 11 having means arranged on one side of said mill for removing from and replacing into the mill said work roll assemblies as a unit comprising means for engaging one of the upper work roll chocks and supporting one end of the unit, said balance means adapted to effect separation of said work rolls so that said work rolls will be supported by the upper backup roll chocks, means for effecting movement of the roll removing and replacing means to remove a roll unit from and for insertion of a roll unit into the mill during which movement said work roll unit will be supported by the upper backup roll chocks and said removing and replacing means.

16. A rolling mill according to claim 15 wherein wheels are carried by the lower legs of said upper work roll chocks, a platform located on the other side of said mill for supporting a work roll unit and having an extension projecting into the adjacent window and supporting the wheels when a roll unit is caused to move through said window, the arrangement being such that the one end of a roll unit is carried by the means for removing and replacing said work roll unit and said upper backup roll chock during a portion of the period of the removal and replacement of the roll unit and by said platform and said removal and replacement means during the rest of the period.

17. A rolling mill according to claim 16 wherein at least the wheels on one side of said chocks are provided with flanges, slots provided in said platform and in said projecting portion arranged to communicate with said flanged wheels for guiding and maintaining said roll unit in a path during the removal and replacement thereof.

18. In combination with a rolling mill having windows into which there are received a pair of roll assemblies including a pair of rolls and chocks secured to the ends of the rolls, a spindle for supplying a driving torque to each roll, means for lifting the rolls, as a unit, and the spindles to a predetermined vertical position and for maintaining said rolls and spindles in the elevated position, roll inserting means for engaging and supporting the spindle end of at least one of the chocks of said roll assemblies, a platform at one side of said mill for receiving a unit consisting of two roll assemblies to be inserted into the mill, said inserting means adapted to engage the roll unit arranged on said platform and to be drawn into the mill whereby the axes of the rolls will coincide with the axes of the spindles when the rolls are completely brought into the mill.

19. In combination with a rolling mill having windows for receiving a pair of roll assemblies, including bearings and chocks affixed to the ends of the rolls and constructed to move laterally as a unit through said windows of the mill, a sled slidably received in the mill and extending into and between the windows thereof adapted to support said roll assemblies during their lateral movement, a base for supporting said mill in a manner that the mill may be moved laterally, a roll changing device comprising a roll unit ejecting and inserting means arranged on one side of said mill movable through said windows in a manner to effect movement of said sled and thus to insert into and eject from said windows said roll assemblies, means arranged on the side of the mill common to said device and connected to said device for effecting movement thereof, said last-mentioned means operative also to effect lateral movement of said mill over said base.

20. In combination with a rolling mill according to claim 19, including mating sliding surfaces on said sled and said mill to permit said sled to slide through the windows during a period of its movement, a pair of rails arranged at the bottom of said windows, a pair of wheels mounted on each end of the sled, the rails and wheels being so arranged and constructed that the roll assemblies are supported by the rails when the sled passes beyond said sliding surfaces of the mill, and a platform for receiving the roll assemblies when ejected from or positioned for insertion into the mill.

21. In combination with a rolling mill according to claim 19 including a pinion stand for supplying the torque to the mill, spindles for connecting the pinions to the rolls, a base for said pinion stand, said stand slidable over said base, said means for effecting movement of the roll assemblies and mill consisting of a piston cylinder assembly and a bar, said bar connected to said piston cylinder assembly and to the adjacent end of said sled and passing through a portion of said pinion stand, locking means associated with said bar and pinion stand to lock the bar to the stand whereby operation of said piston cylinder assembly will effect lateral movement of said pinion stand, spindles and mill as a unit and when in its non-locking position the operation of said piston cylinder assembly will effect movement of the roll assemblies relative to said mill.

22. In combination with a rolling mill according to claim 21 in which means are provided to lock either said mill or said pinion stand to their respective bases.

References Cited by the Examiner

UNITED STATES PATENTS

| | | | |
|---|---|---|---|
| 749,745 | 1/04 | Von Philp | 80—1.3 |
| 1,761,747 | 6/30 | Rosin et al. | 104—35 |
| 1,819,017 | 8/31 | Drake | 104—38 |
| 1,833,376 | 11/31 | Simmons | 80—31.1 |
| 1,935,091 | 11/33 | Iversen | 80—38 |
| 2,037,210 | 4/36 | Buente | 80—1 |
| 2,140,929 | 12/38 | Talbot | 80—55 |
| 2,835,021 | 5/58 | O'Malley | 80—55 |
| 2,938,706 | 5/60 | Langen | 254—106 |
| 3,136,182 | 6/64 | Wegmann et al. | 80—1.3 |

FOREIGN PATENTS 622,504  11/35  Germany.

CHARLES W. LANHAM, *Primary Examiner.*

THOMAS E. BEALL, LEON PEAR, ROBERT F. WHITE, *Examiners.*

UNITED STATES PATENT OFFICE

CERTIFICATE OF CORRECTION

Patent No. 3,208,260　　　　　　　　　　　September 28, 1965

Maurice Paul Sieger et al.

It is certified that error appears in the above identified patent and that said Letters Patent are hereby corrected as shown below:

Column 12, line 49, "windows" should read -- window --; line 53, "supporting" should read -- inserting --.

Signed and sealed this 11th day of November 1969.

(SEAL)
Attest:

Edward M. Fletcher, Jr.　　　　　　　　　WILLIAM E. SCHUYLER, JR.
Attesting Officer　　　　　　　　　　　　　　Commissioner of Patents